United States Patent
Kirchner

(10) Patent No.: US 9,226,031 B2
(45) Date of Patent: *Dec. 29, 2015

(54) TRANSFER OF DATA RELATED TO BROADCAST PROGRAMMING OVER A COMMUNICATION NETWORK

(71) Applicant: DISH Network L.L.C., Englewood, CO (US)

(72) Inventor: Anton H. Kirchner, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,588

(22) Filed: Aug. 21, 2014

(65) Prior Publication Data

US 2014/0366078 A1  Dec. 11, 2014

Related U.S. Application Data

(63) Continuation of application No. 12/328,082, filed on Dec. 4, 2008, now Pat. No. 8,819,743.

(60) Provisional application No. 61/015,081, filed on Dec. 19, 2007.

(51) Int. Cl.
*H04N 5/445* (2011.01)
*H04N 21/462* (2011.01)
(Continued)

(52) U.S. Cl.
CPC .......... *H04N 21/4622* (2013.01); *H04H 60/72* (2013.01); *H04H 60/80* (2013.01);
(Continued)

(58) Field of Classification Search
USPC .......................................... 725/40, 52, 59, 87
See application file for complete search history.

(56) References Cited

U.S. PATENT DOCUMENTS

| 1,994,998 A | 3/1935 | Hull |
| 3,347,505 A | 10/1967 | Menser |

(Continued)

FOREIGN PATENT DOCUMENTS

| JP | 2000-049516 A | 2/2000 |
| JP | 2002-374108 A | 12/2002 |

(Continued)

OTHER PUBLICATIONS

Intellectual Property Office of the Republic of China (Taiwan) for ROC Pat App. No. 097149159, Office Action dated Sep. 19, 2014, 20 pages.

(Continued)

*Primary Examiner* — Kieu Oanh T Bui
(74) *Attorney, Agent, or Firm* — Kilpatrick Townsend & Stockton LLP

(57) ABSTRACT

A broadcast programming receiver is provided which includes a broadcast programming interface, a memory, a communication network interface, and output circuitry. The broadcast programming interface is configured to receive broadcast programming, while the output circuitry is configured to transfer the broadcast programming to an output device. The memory is configured to store data related to the broadcast programming. In one embodiment, the communication network interface is configured to receive the data related to the broadcast programming over a communication network from a second broadcast programming receiver and transfer the data to the memory. In another implementation, the communication network interface is configured to receive the data from the memory and send the data over the communication network to a second broadcast programming receiver.

20 Claims, 6 Drawing Sheets

(51) Int. Cl.
*H04H 60/72* (2008.01)
*H04H 60/80* (2008.01)
*H04N 7/173* (2011.01)
*H04N 21/4147* (2011.01)
*H04N 21/436* (2011.01)
*H04N 21/4788* (2011.01)
*H04H 60/27* (2008.01)

(52) U.S. Cl.
CPC ....... *H04N7/17318* (2013.01); *H04N 21/4147* (2013.01); *H04N 21/43615* (2013.01); *H04N 21/4788* (2013.01); *H04H 60/27* (2013.01)

(56) References Cited

U.S. PATENT DOCUMENTS

| | | | |
|---|---|---|---|
| 3,392,848 A | 7/1968 | McConnell et al. |
| 3,728,796 A | 4/1973 | Lobaugh |
| 4,174,821 A | 11/1979 | Levine |
| 4,203,639 A | 5/1980 | Mohr et al. |
| 4,358,096 A | 11/1982 | Paton et al. |
| 4,361,375 A | 11/1982 | Bailey et al. |
| 4,500,064 A | 2/1985 | Calabro |
| 4,535,689 A | 8/1985 | Putkowski |
| 4,546,549 A | 10/1985 | Duperon |
| 4,589,213 A | 5/1986 | Woodward |
| 4,598,297 A | 7/1986 | Hawkins |
| 4,698,640 A | 10/1987 | Redman |
| 4,850,114 A | 7/1989 | Vockins |
| 4,858,865 A | 8/1989 | Schrepfer |
| 4,858,878 A | 8/1989 | Gassaway |
| 4,888,875 A | 12/1989 | Strother |
| 4,908,949 A | 3/1990 | Jaccard |
| 4,934,706 A | 6/1990 | Marshall |
| 5,002,216 A | 3/1991 | Gerber |
| 5,063,679 A | 11/1991 | Schwandt |
| 5,149,277 A | 9/1992 | LeMaster |
| 5,154,000 A | 10/1992 | Mahoney et al. |
| 5,167,075 A | 12/1992 | Weldy et al. |
| 5,306,165 A | 4/1994 | Nadeau |
| 5,359,820 A | 11/1994 | McKay |
| 5,574,256 A | 11/1996 | Cottone |
| 5,617,680 A | 4/1997 | Beatty |
| 5,738,020 A | 4/1998 | Correia |
| 5,886,673 A | 3/1999 | Thomas |
| 5,947,752 A | 9/1999 | Wu |
| 5,963,179 A | 10/1999 | Chavez |
| 6,180,878 B1 | 1/2001 | Gretz |
| 6,262,691 B1 | 7/2001 | Austin et al. |
| 6,273,377 B1 | 8/2001 | Archer |
| 6,293,035 B1 | 9/2001 | LaPointe |
| 6,361,007 B1 | 3/2002 | Oby et al. |
| 6,366,253 B1 | 4/2002 | Hemmingsen, II |
| 6,375,161 B2 | 4/2002 | Garceau |
| 6,385,856 B1 | 5/2002 | Godin |
| 6,396,459 B1 | 5/2002 | Pullman |
| 6,404,405 B2 | 6/2002 | Wanat |
| 6,427,348 B1 | 8/2002 | Webb |
| 6,445,361 B2 | 9/2002 | Liu et al. |
| 6,450,464 B1 | 9/2002 | Thomas |
| 6,460,821 B1 | 10/2002 | Rhudy et al. |
| 6,532,675 B2 | 3/2003 | Letourneau |
| 6,727,861 B2 | 4/2004 | Antoine |
| 6,731,250 B1 | 5/2004 | Berman |
| 6,766,992 B1 | 7/2004 | Parker |
| 6,768,474 B2 | 7/2004 | Hunt |
| 6,777,611 B2 | 8/2004 | Ewald et al. |
| 6,834,435 B2 | 12/2004 | Turner |
| 6,873,304 B1 | 3/2005 | Malhotra |
| 6,905,060 B2 | 6/2005 | Van Aken et al. |
| 6,996,911 B1 | 2/2006 | Dinius |
| 7,000,746 B2 | 2/2006 | Mackin et al. |
| 7,027,006 B2 | 4/2006 | Holle |
| D522,967 S | 6/2006 | St. Clair |
| 7,057,575 B2 | 6/2006 | Malhotra |
| 7,106,082 B2 | 9/2006 | Yoshioka |
| 7,106,273 B1 | 9/2006 | Brunson et al. |
| 7,122,738 B2 | 10/2006 | Kanamaru |
| 7,220,129 B1 | 5/2007 | Nishijima et al. |
| 7,253,785 B2 | 8/2007 | Holle |
| 7,260,920 B2 | 8/2007 | Weir |
| 7,435,901 B2 | 10/2008 | Mori et al. |
| 7,456,802 B1 | 11/2008 | Bourgeois |
| 7,460,081 B2 | 12/2008 | Holle |
| 7,554,036 B1 | 6/2009 | DeCosta |
| 7,555,842 B1 | 7/2009 | Asay |
| 7,563,131 B2 | 7/2009 | Sullivan et al. |
| 7,592,719 B2 | 9/2009 | Hoopes |
| D603,342 S | 11/2009 | DeCosta |
| 7,648,379 B2 | 1/2010 | Johnson et al. |
| 7,651,353 B2 | 1/2010 | Laukhuf |
| 7,683,853 B2 | 3/2010 | Michaelis |
| 7,692,094 B1 | 4/2010 | DeCosta |
| 7,741,562 B2 | 6/2010 | Crotinger et al. |
| D632,545 S | 2/2011 | DeCosta |
| 7,918,425 B2 | 4/2011 | Rathbone et al. |
| 7,997,546 B1 | 8/2011 | Anderson et al. |
| 8,011,628 B1 | 9/2011 | Suddeth |
| 8,015,929 B2 | 9/2011 | Tyner |
| D647,488 S | 10/2011 | DeCosta |
| 8,061,051 B2 | 11/2011 | Allemand |
| 8,081,139 B2 | 12/2011 | Schmidt et al. |
| 8,336,221 B2 | 12/2012 | Steele et al. |
| 8,339,329 B2 | 12/2012 | Shen |
| 8,350,153 B1 | 1/2013 | DeCosta |
| D678,840 S | 3/2013 | DeCosta |
| D684,935 S | 6/2013 | DeCosta |
| 8,462,075 B2 | 6/2013 | Lettkeman |
| 8,646,186 B2 | 2/2014 | Lettkeman et al. |
| 8,698,692 B2 | 4/2014 | Lettkeman |
| 8,780,008 B2 | 7/2014 | Lettkeman et al. |
| 8,819,743 B2 | 8/2014 | Kirchner |
| 8,907,862 B2 | 12/2014 | Lettkeman |
| 2002/0003504 A1 | 1/2002 | Yoshida et al. |
| 2002/0067591 A1 | 6/2002 | Tajima |
| 2002/0105476 A1 | 8/2002 | Overton |
| 2002/0190172 A1 | 12/2002 | Oddsen, Jr. |
| 2003/0086023 A1 | 5/2003 | Chung et al. |
| 2003/0229900 A1 | 12/2003 | Reisman |
| 2004/0149475 A1 | 8/2004 | Gorin |
| 2004/0248462 A1 | 12/2004 | Dyer et al. |
| 2005/0001781 A1 | 1/2005 | Antoine |
| 2005/0007241 A1 | 1/2005 | Kline et al. |
| 2005/0101183 A1 | 5/2005 | McCoy et al. |
| 2005/0101336 A1 | 5/2005 | Otsuka |
| 2005/0250375 A1 | 11/2005 | Allison |
| 2006/0053447 A1 | 3/2006 | Krzyzanowski et al. |
| 2006/0067066 A1 | 3/2006 | Meier et al. |
| 2006/0248553 A1 | 11/2006 | Mikkelson et al. |
| 2007/0192798 A1 | 8/2007 | Morgan |
| 2007/0210978 A1 | 9/2007 | Zihlman |
| 2008/0117091 A1 | 5/2008 | Binder |
| 2008/0233794 A1 | 9/2008 | Clark et al. |
| 2008/0271331 A1 | 11/2008 | Allemand |
| 2009/0052122 A1 | 2/2009 | Johnson et al. |
| 2009/0056970 A1 | 3/2009 | Hoffman et al. |
| 2009/0124113 A1 | 5/2009 | Sexton et al. |
| 2009/0150940 A1 | 6/2009 | St. John-Larkin |
| 2009/0165058 A1 | 6/2009 | Kirchner |
| 2009/0251880 A1 | 10/2009 | Anderson |
| 2009/0315804 A1 | 12/2009 | Schmidt et al. |
| 2010/0031295 A1 | 2/2010 | Krzyzanowski et al. |
| 2010/0046194 A1 | 2/2010 | Yang et al. |
| 2010/0075540 A1 | 3/2010 | Liao |
| 2010/0141379 A1 | 6/2010 | Tucker et al. |
| 2010/0147580 A1 | 6/2010 | Koesterich |
| 2010/0177010 A1 | 7/2010 | Michaelis |
| 2010/0219183 A1 | 9/2010 | Azancot et al. |
| 2011/0021066 A1 | 1/2011 | Squires |
| 2011/0032172 A1 | 2/2011 | Kirby et al. |
| 2011/0032175 A1 | 2/2011 | Kang |
| 2011/0083399 A1 | 4/2011 | Lettkeman et al. |
| 2011/0156984 A1 | 6/2011 | Caldwell et al. |
| 2011/0187624 A1 | 8/2011 | Lettkeman et al. |

(56) References Cited

U.S. PATENT DOCUMENTS

| | | | |
|---|---|---|---|
| 2011/0205142 | A1 | 8/2011 | Lettkeman |
| 2011/0259883 | A1 | 10/2011 | DeCosta |
| 2012/0137530 | A1 | 6/2012 | Yun |
| 2012/0151785 | A1 | 6/2012 | Lettkeman et al. |
| 2012/0162044 | A1 | 6/2012 | Lettkeman et al. |
| 2012/0256496 | A1 | 10/2012 | DeCosta |
| 2012/0256809 | A1 | 10/2012 | Lettkeman |
| 2012/0261529 | A1 | 10/2012 | Lettkeman |
| 2013/0056259 | A1 | 3/2013 | Lettkeman |
| 2013/0256480 | A1 | 10/2013 | Lettkeman |
| 2014/0033496 | A1 | 2/2014 | Lettkeman et al. |
| 2014/0090260 | A1 | 4/2014 | Lettkeman et al. |
| 2014/0174816 | A1 | 6/2014 | Lettkeman |
| 2014/0252182 | A1 | 9/2014 | Lettkeman et al. |

FOREIGN PATENT DOCUMENTS

| | | |
|---|---|---|
| KR | 2000-0047707 A | 7/2000 |
| WO | 2014/022087 A1 | 2/2014 |

OTHER PUBLICATIONS

U.S. Appl. No. 13/563,537, filed Jul. 31, 2012, Final Office Action mailed Jan. 30, 2015, 36 pages.
Author Unknown, "BMI Measuring Instruments," Accessed on Mar. 13, 2011, 9 pages. Retrieved from: http://bmicanada.ca/products.html.
Author Unknown, "Stanley Hand Tools, 77-009—IntelliPoint Plus Level," Accessed on Mar. 13, 2011, 1 page. Retrieved from: http://www.stanleytools.com.html.
Author Unknown, "Checkpoint U6 V-Groove Level," Chads Tool Box.com, Accessed on Mar. 13, 2011, 6 pages. Retrieved from: http://www.chadstoolbox.com.
Author Unknown, "Midlite Quality Custom Products, The Power Jumper, HDTV Power Relocation Kit," Accessed on Nov. 10, 2011, 1 page. Retrieved from: www. Midlite.com.
Author Unknown, "PowerBridge, 3D Power Cable Total Solution Connector Kit Model #TSCK Power Extension Cable Management," Accessed on Oct. 18, 2013, 2 pages.
Author Unknown, "Powerbridge In-Wall Power Extension System Home," Accessed on Sep. 7, 2011, 4 pages. Retrieved from: http://www.powerbridgesolution.com.
Author Unknown, "Legrand Flat Screen Tv Cord and Cable Power Kit—CMK70," Accessed 2011, 1 page.
Author Unknown, "Owner's Manual," Locon Treestands, LLC, Waterford, Ohio, Accessed on Oct. 13, 2009, 2 pages. Retrieved from: http://www.locontreestandsllc.com.
Author Unknown, "PowerBridge Ultra Low Profile In-Wall System," Accessed on Oct. 18, 2013, 2 pages. Retrieved from: http://www.homedepot.com/catalog/pdfImages/ef/ef60a932-d90e-4a49-aa33-576da0d6feb6.pdf.
Author Unknown, "Sewell DataComm Flat Panel TV Cable Organizer Remodeling Kit with Power Outlet," Accessed on Nov. 1, 2013, 3 pages. Retrieved from: http://sewelldirect.com/Recessed-Cable-Plate-Remodeling-Kit-with-Electrical-Outlet.asp.
International Search Report and Written Opinion of PCT/US2013/050597 mailed Jan. 10, 2014, 17 pages.
International Search Report and Written Opinion of PCT/US2010/052431 mailed Jun. 10, 2011, 7 pages.
International Search Report and Written Opinion of PCT/US2008/086423 mailed on May 11, 2008, 14 pages.
Intellectual Property Office of the Republic of China (Taiwan) for Application No. 097149159, Office Action dated Mar. 28, 2012, 16 pages.
Intellectual Property Office of the Republic of China (Taiwan) for Application No. 097149159, Final Office Action dated Dec. 13, 2012, 9 pages.
U.S. Appl. No. 12/328,082, filed Dec. 4, 2008, Non Final Office Action mailed Jan. 14, 2011, 19 pages.
U.S. Appl. No. 12/328,082, filed Dec. 4, 2008, Non Final Office Action mailed Nov. 15, 2011, 18 pages.
U.S. Appl. No. 12/328,082, filed Dec. 4, 2008, Non Final Office Action mailed Apr. 20, 2012, 13 pages.
U.S. Appl. No. 12/328,082, filed Dec. 4, 2008, Final Office Action mailed Oct. 26, 2012, 16 pages.
U.S. Appl. No. 12/328,082, filed Dec. 4, 2008, Non Final Office Action mailed Jul. 8, 2013, 16 pages.
U.S. Appl. No. 12/328,082, filed Dec. 4, 2008, Final Office Action mailed Dec. 5, 2013, 13 pages.
U.S. Appl. No. 12/328,082, filed Dec. 4, 2008, Notice of Allowance mailed Apr. 16, 2014, 24 pages.
U.S. Appl. No. 12/483,016, filed Jun. 11, 2009, Notice of Allowance mailed Nov. 8, 2011, 8 pages.
U.S. Appl. No. 12/578,367, filed Oct. 13, 2009, Non-Final Office Action mailed Sep. 20, 2011, 21 pages.
U.S. Appl. No. 12/578,367, filed Oct. 13, 2009, Final Office Action mailed Jan. 31, 2012, 11 pages.
U.S. Appl. No. 12/578,367, filed Oct. 13, 2009, Non-Final Office Action mailed May 14, 2012, 12 pages.
U.S. Appl. No. 12/578,367, filed Oct. 13, 2009, Final Office Action mailed Nov. 19, 2012, 10 pages.
U.S. Appl. No. 12/711,103, filed Feb. 23, 2010, Non- Final Office Action mailed Aug. 1, 2012, 16 pages.
U.S. Appl. No. 12/711,103, filed Feb. 23, 2010, Notice of Allowance mailed Feb. 12, 2013, 13 pages.
U.S. Appl. No. 12/970,749, filed Dec. 16, 2010, Non-Final Office Action mailed Sep. 14, 2012, 16 pages.
U.S. Appl. No. 12/970,749, filed Dec. 16, 2010, Final Office Action mailed Feb. 6, 2013, 15 pages.
U.S. Appl. No. 12/970,749, filed Dec. 16, 2010, Non-Final Office Action mailed May 16, 2013, 13 pages.
U.S. Appl. No. 12/970,749, filed Dec. 16, 2010, Notice of Allowance mailed Sep. 5, 2013, 9 pages.
U.S. Appl. No. 12/970,749, filed Dec. 16, 2010, Notice of Allowance mailed Apr. 16, 2014, 24 pages.
U.S. Appl. No. 12/979,597, filed Dec. 28, 2010, Non-Final Office Action mailed Mar. 28, 2014, 12 pages.
U.S. Appl. No. 13/081,364, filed Apr. 6, 2011, Non-Final Office Action mailed Apr. 25, 2013, 12 pages.
U.S. Appl. No. 13/084,632, filed Apr. 12, 2011 Non-Final Rejection mailed Jun. 3, 2013, 9 pages.
U.S. Appl. No. 13/084,632, filed Apr. 12, 2011 Notice of Allowance mailed Nov. 18, 2013, 23 pages.
U.S. Appl. No. 13/084,632, filed Apr. 12, 2011, Notice of Allowance mailed Mar. 6, 2014, 15 pages.
U.S. Appl. No. 13/085,210, filed Apr. 12, 2011 Non-Final Office Action mailed Mar. 27, 2013, 11 pages.
U.S. Appl. No. 13/085,210, filed Apr. 12, 2011 Notice of Allowance mailed Aug. 8, 2014, 20 pages.
U.S. Appl. No. 13/085,210, filed Apr. 12, 2011 Final Office Action mailed Oct. 25, 2013, 12 pages.
U.S. Appl. No. 13/226,929, filed Sep. 7, 2011, Non-Final Office Action mailed Jun. 28, 2013, 31 pages.
U.S. Appl. No. 13/226,929, filed Sep. 7, 2011, Final Office Action mailed Feb. 12, 2014, 30 pages.
U.S. Appl. No. 13/226,929, filed Sep. 7, 2011, Notice of Allowance mailed Mar. 31, 2014, 16 pages.
U.S. Appl. No. 13/893,304, filed May 13, 2013, Non-Final Office Action mailed Aug. 1, 2013, 10 pages.
U.S. Appl. No. 13/893,304, filed May 13, 2013, Notice of Allowance mailed Dec. 2, 2013, 23 pages.
U.S. Appl. No. 14/098,294, filed Dec. 5, 2013, Non Final Office Action mailed Mar. 13, 2014, 15 pages.
U.S. Appl. No. 14/098,294, filed Dec. 5, 2013, Notice of Allowance mailed Jul. 30, 2014, 21 pages.
U.S. Appl. No. 12/979,597, filed Dec. 28, 2010, Final Office Action mailed Sep. 17, 2014, 16 pages.
U.S. Appl. No. 14/193,641, filed Feb. 28, 2014, Non-Final Office Action mailed Feb. 28, 2014, 36 pages.

(56) References Cited

OTHER PUBLICATIONS

International Preliminary Report on Patentability for PCT/US2013/050597 mailed Feb. 12, 2015, 6 pages.

U.S. Appl. No. 14/188,408, filed Feb. 24, 2014 Non-Final Office Action mailed May 21, 2015, 23 pages.

U.S. Appl. No. 13/563,537, filed Jul. 31, 2012, Notice of Allowance mailed Jun. 8, 2015, 32 pages.

U.S. Appl. No. 12/979,597, filed Dec. 28, 2010, Non Final Office Action mailed Mar. 30, 2015, 17 pages.

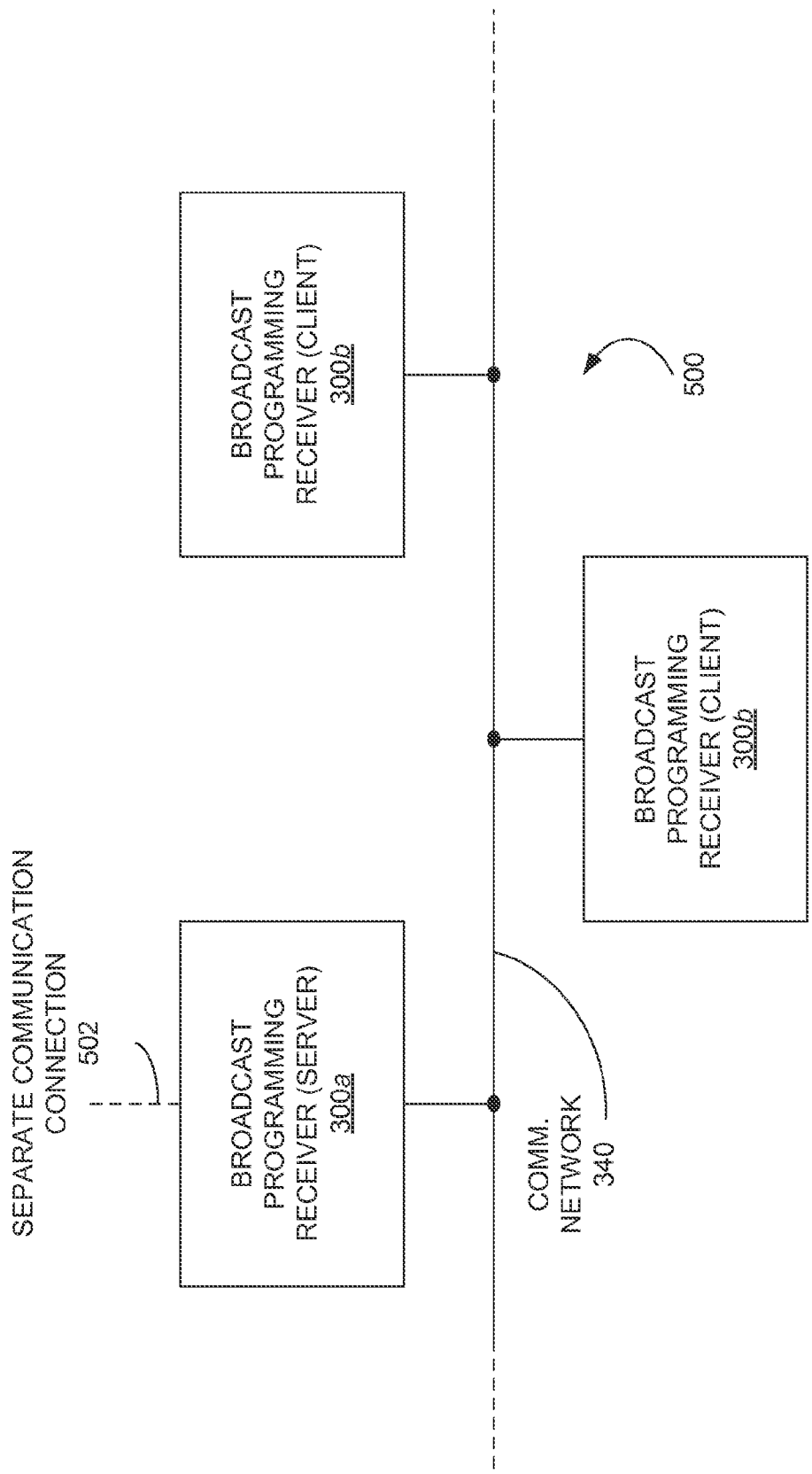

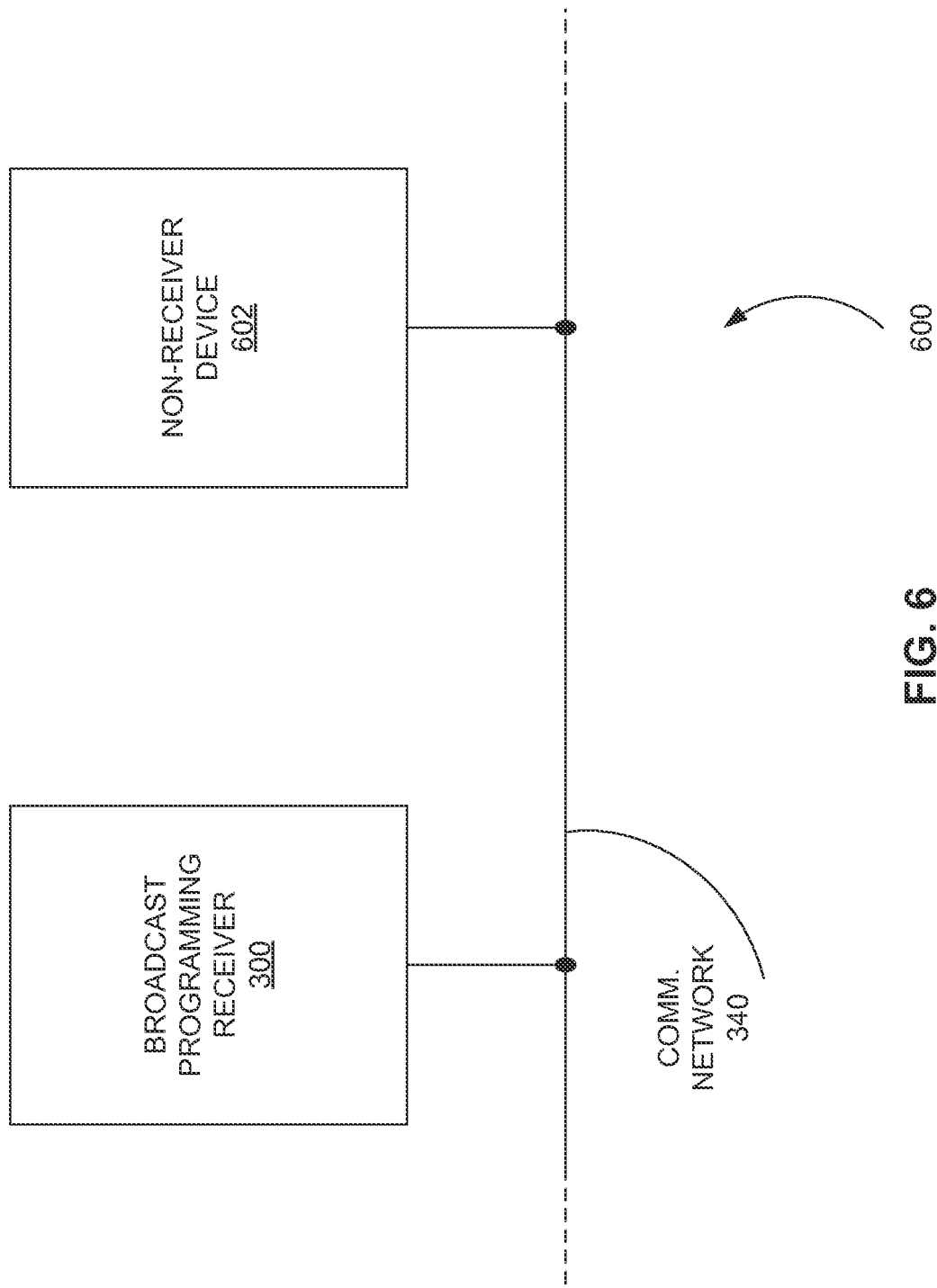

TRANSFER OF DATA RELATED TO BROADCAST PROGRAMMING OVER A COMMUNICATION NETWORK

CROSS-REFERENCE TO RELATED APPLICATIONS

This application is a continuation of copending U.S. patent application Ser. No. 12/328,082 entitled "TRANSFER OF DATA RELATED TO BROADCAST PROGRAMMING OVER A COMMUNICATION NETWORK" and filed 4 Dec. 2008, which claims the benefit of U.S. Provisional Application No. 61/015,081, entitled "TRANSFER OF DATA RELATED TO BROADCAST PROGRAMMING OVER A COMMUNICATION NETWORK" and filed 19 Dec. 2007, which are hereby incorporated herein by reference in their entirety.

BACKGROUND

The delivery of radio and television programming by way of terrestrial, satellite, or cable signals to an audio/video receiver or set-top box located in the typical home now provides users access to an unprecedented amount of entertainment, news, weather, and sports programming. Further, by employing multiple such receivers in a home or similar structure, access to this programming is enhanced by allowing use of the programming in any room which provides such a receiver in conjunction with an output device, such as a television or video monitor.

Typically, each deployed receiver or set-top box also receives a significant amount of data related to the broadcast programming. One example of this data is the event information associated with the electronic program guide (EPG), which typically is available to the user of the receiver by way of a special button provided on a remote control device accompanying the receiver. Normally, the EPG provides information relating to the individual programs available via the receiver, including, for example, the title of the program, a short synopsis of the content, the particular dates and times the program is to be broadcast, and similar information.

Other data related to the programming may be generated within each receiver. One typical example of such data is the recording settings associated with a data storage device, such as a digital video recorder (DVR), incorporated into the receiver for recording programs. These settings often include an identification of the program to be recorded, and the start time and length of the recording, for each program being recorded. The DVR may also allow the setting of various recording options, such as the recording of each episode of a television series, first-run episodes only, and other recording parameters.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 5 is a block diagram of a client-server networked system of receivers according to an embodiment of the invention.

FIG. 6 is a block diagram of a networked system according to an embodiment of the invention in which a broadcast programming receiver is coupled with a non-receiver device.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
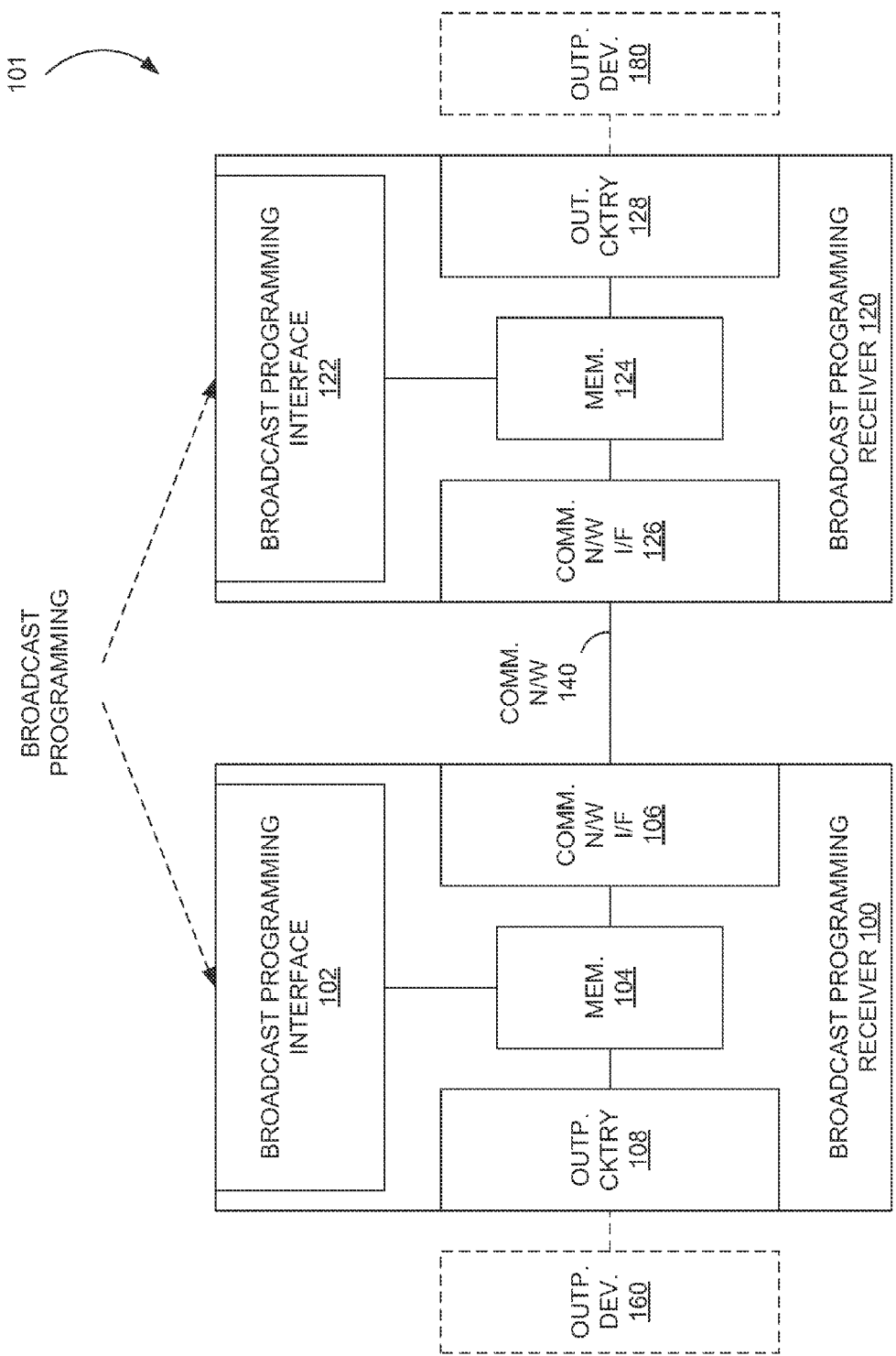
FIG. 1 is a block diagram of two broadcast programming receivers coupled by way of a communication network according to an embodiment of the invention.

FIG. 1 provides a block diagram of a system 101 including two broadcast programming receivers 100, 120 coupled together by way of a communication network 140 according to an embodiment of the invention. The first broadcast programming receiver 100 includes a broadcast programming interface 102, a memory 104, a communication network interface 106, and output circuitry 108. The broadcast programming interface 102 is configured to receive broadcast programming, while the output circuitry 108 is configured to transfer the broadcast programming to an output device, such as the output device 160 shown in FIG. 1. The memory 104 is configured to store data related to the broadcast programming. In one embodiment, the data is received over the broadcast programming interface 102. The communication network interface 106 is configured to receive the data related to the broadcast programming from the memory 104, and to send the data over the communication network 140. In the specific example of FIG. 1, the transmitted data is received by the second broadcast programming receiver 120, discussed below. In FIG. 1, the memory 104 may also be coupled with the output circuitry 108 to enable transfer of the broadcast programming from the broadcast programming interface 102 to the output circuit 108.

Similarly, the second broadcast programming receiver 120 includes a broadcast programming interface 122, a memory 124, a communication network interface 126, and output circuitry 128. The broadcast programming interface 122 is configured to receive broadcast programming, while the output circuitry 128 is configured to transfer the broadcast programming to an output device, such as the output device 180 depicted in FIG. 1. The communication network interface 126 is configured to receive data related to the broadcast programming and transfer the data to the memory 124. In the specific example of FIG. 1, the data is received from the first broadcast programming receiver 100, described above. The memory 124 is configured to store the received data. In the embodiment of FIG. 1, the memory 124 may also be coupled with the broadcast programming interface 122 and the output circuitry 128 to facilitate transfer of the broadcast programming therebetween.

Each of the first receiver 100 and the second receiver 120 may also include control logic (not shown in FIG. 1) to initiate and coordinate the functions of the various components of the receivers 100, 120. A discussion of such control logic is provided in greater detail below.

Figure 2:
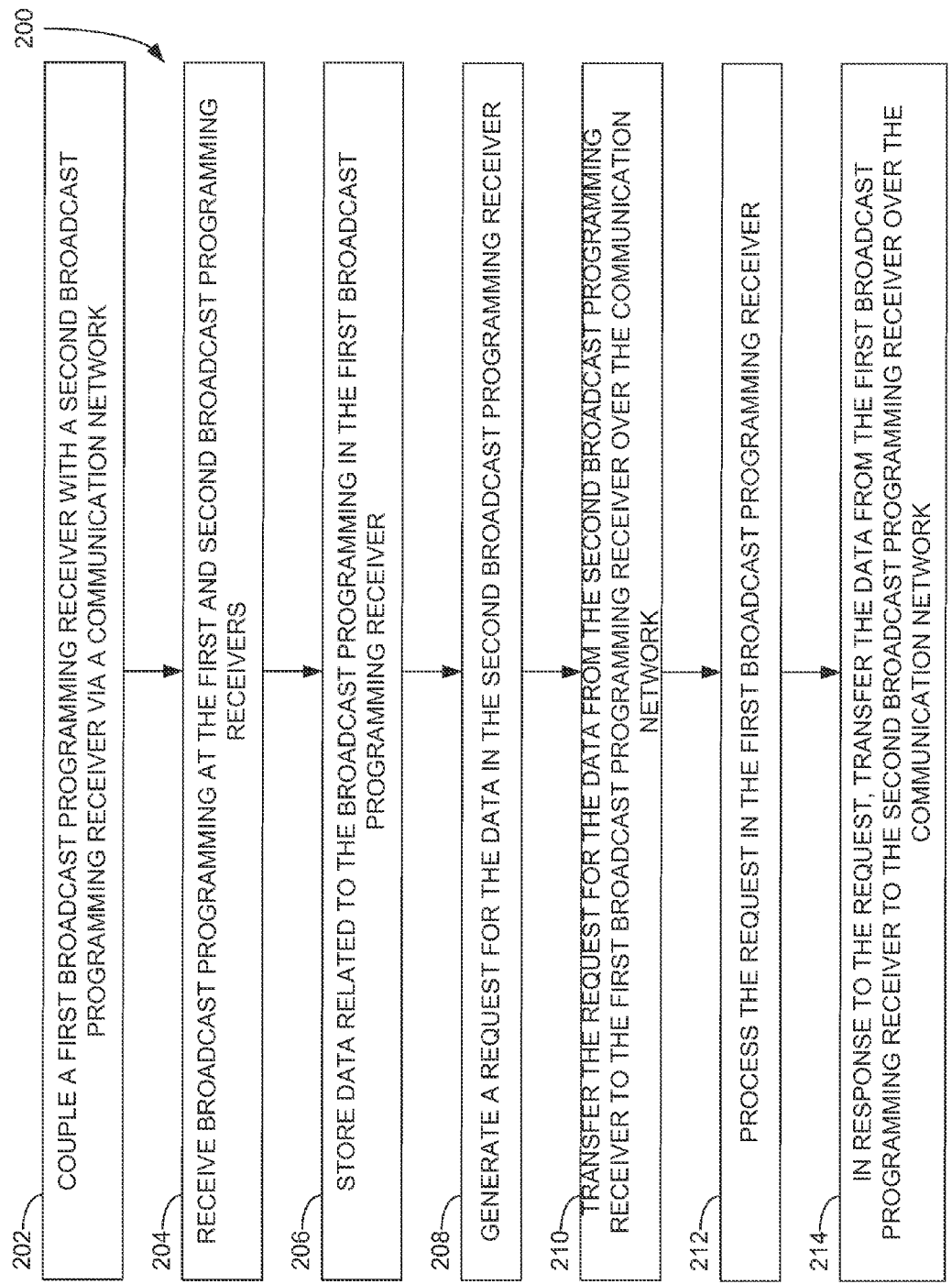
FIG. 2 is a flow diagram of a method according to an embodiment of the invention for transferring data related to broadcast programming among broadcast programming receivers.

A method 200 for transferring data related to broadcast programming among broadcast programming receivers is presented in the flow diagram of FIG. 2. In the method 200, a first broadcast programming receiver is coupled with a second broadcast programming receiver via a communication network (operation 202). Broadcast programming is received at both the first and second broadcast programming receivers (operation 204). Data related to the broadcast programming is stored in the first broadcast programming receiver (operation 206). A request for the data is generated in the second broadcast programming receiver (operation 208). The request for the data is then transferred from the second broadcast programming receiver to the first broadcast programming receiver over the communication network (operation 210). The request is processed in the first broadcast programming receiver (operation 212). In response to the request, the data related to the broadcast programming is transferred from the first broadcast programming receiver to the second broadcast programming receiver over the communication network (operation 214).

While the flow diagram of FIG. 2 indicates a particular order of execution of the operations 202-214 listed above, other orders of execution, including concurrent execution of various operations, may be possible while remaining within the scope of the invention. For example, the receiving of broadcast information at the first and second broadcast receivers may occur concurrently with the execution of any of the other operations of the method 200.

Figure 3:
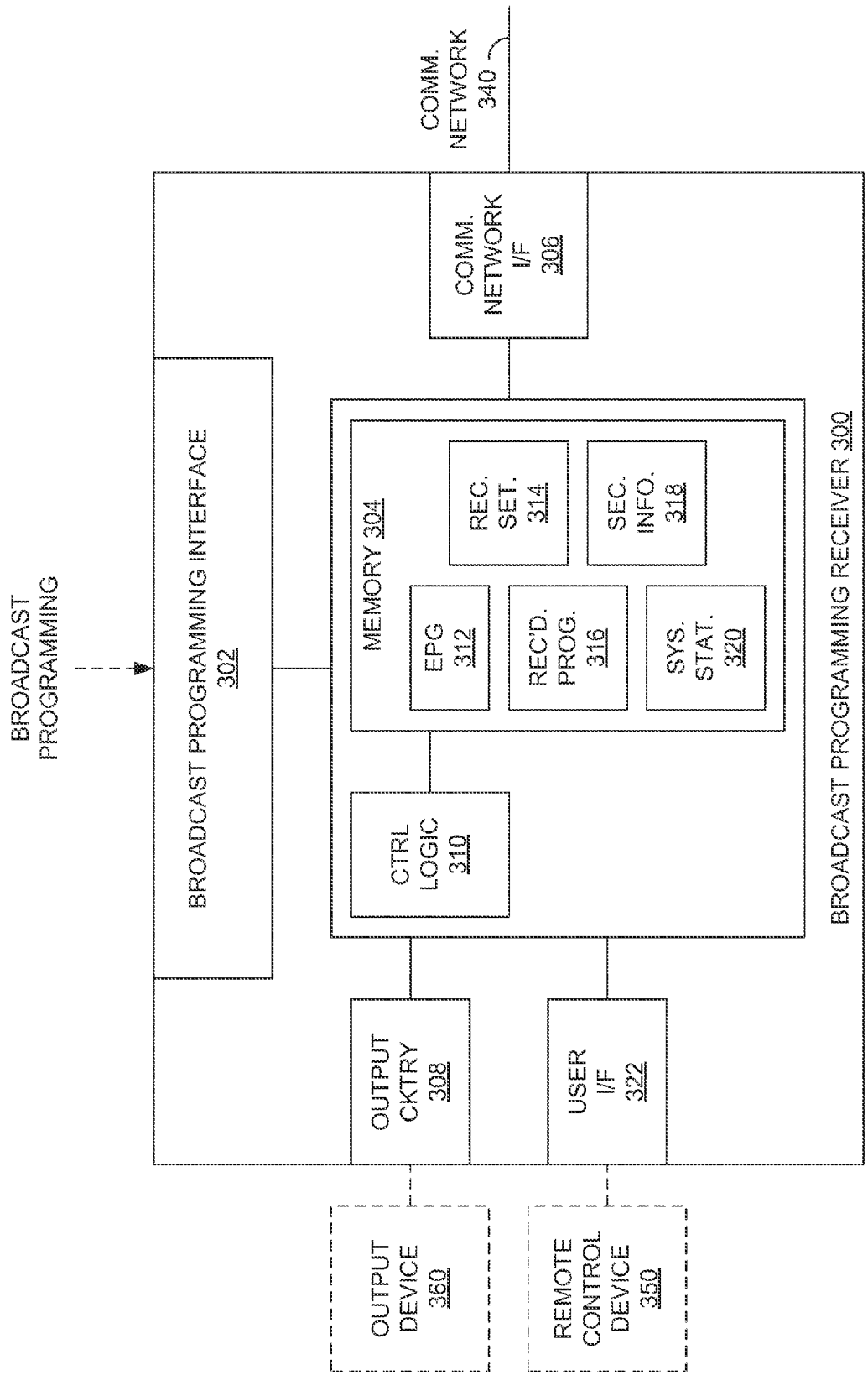
FIG. 3 is a block diagram of a broadcast programming receiver according to another embodiment of the invention.

The block diagram of FIG. 3 provides a more detailed view of a broadcast programming receiver 300 according to another embodiment of the invention. Generally, the receiver 300 may either send or receive data related to broadcast programming over a communication network 340. In one embodiment, the data may be sent to or received from another broadcast programming receiver (not shown in FIG. 3). In another application, the data may be transferred between the receiver 300 and one or more other electronic devices, such as personal computers (PCs) or personal digital assistants (PDAs).

The broadcast programming receiver 300 may be any receiver configured to receive broadcast programming. Examples include, but are not limited to, a satellite television broadcast set-top box, such as a direct broadcast satellite (DBS) receiver, a cable television set-top box, a terrestrial ("over-the-air") set-top box, and a satellite radio receiver. In the satellite television broadcast environment, the receiver 300 may be coupled with an output device 360, such as a television, video monitor, or audio amplifier, to allow a user to receive the broadcast programming in an audio or visual format. The connection between the receiver 300 and the output device 360 may be any kind of wired or wireless connection suitable for carrying the broadcast programming in a format understandable by the output device 360. Examples of such a connection include, but are not limited to, a composite video interface, a component video interface, a modulated radio frequency (RF) video interface, and the High Definition Multimedia Interface (HDMI).

The broadcast programming receiver 300 includes a broadcast programming interface 302, a memory 304, a communication network interface 306, output circuitry 308, a user interface 322, and control logic 310. The broadcast programming interface 302 includes circuitry which allows the receiver 300 to receive the broadcast programming from an external source, such as from a television broadcast satellite by way of a satellite antenna, a cable television head-end via a coaxial cable, or a terrestrial television distribution station by way of a terrestrial antenna. Such circuitry may perform a number of functions, such as frequency conversion of an incoming signal, tuning or selection of one or more programming channels or transponders from the incoming signal, and descrambling and/or decoding of one or more of the programming channels for presentation to the user.

The communication network interface 306 is configured to allow the broadcast programming receiver 300 to communicate with other devices, such as another broadcast programming receiver, over a communication network 340. The communication network 340 may be any communication network capable of transferring data to and from the broadcast programming receiver 300. In one embodiment, the communication network 340 may be a communication network implemented over the alternating current (AC) power lines of a home or other building, such as the network described in the HomePlug® 1.0 Specifications, published by the HomePlug® Powerline Alliance, and incorporated herein by reference in its entirety. Typically, a connection between the communication network interface 306 and such a network 340 is facilitated over the same power line cord employed by most electronic devices to receive AC power from a wall socket. Other types of communication networks, such as Ethernet, and other types of communication media, such as wireless, coaxial cable, 10/100 Base-T Category (CAT) 5 cable, and the like, may be utilized in other implementations.

The output circuitry 308 is configured to transfer the broadcast programming received over the broadcast programming interface 302 to the output device 360. The output circuitry 308 may include circuitry for signal formatting, frequency conversion, and the like in order to convert the programming into a form suitable for use by the output device 360.

The user interface 322 includes circuitry for receiving user commands and other user input. Such input may be relayed to the user interface 322 by way of a remote control device 350, by user controls on the receiver 300 itself, or both. The user interface 322 may receive wireless signals from the remote control device 350 that are infrared signals, ultra-high frequency (UHF) or other RF signals, or other types of wireless signals.

The control logic 310 operates to control one or more components of the broadcast programming receiver 300, such as any of the broadcast programming interface 302, the communication network interface 306, the user interface 322, and the output circuitry 308. The control logic 310 may include a processing unit, such as a microprocessor, microcontroller, or digital signal processor (DSP) executing software or firmware to perform the various control functions discussed herein. In another embodiment, digital hardware control circuitry, or a combination of hardware and software or firmware elements, may be employed as the control logic 310.

Coupled with the control logic 310 is memory 304, which may include any of read-only memory (ROM), random-access memory (RAM), and a mass data storage device, such as a magnetic or optical disk drive. Other forms of digital memory storage may be employed in other implementations. The memory 304 may serve a number of functions, such as storage for the instructions and data related to software or firmware executed by the control logic 310. The memory 304 may also provide sufficient storage for one or more programs received over the broadcast programming interface 302, thus facilitating digital video recorder (DVR) functionality in the receiver 300.

In addition, the memory 304 provides storage for data related to the broadcast programming received by way of the broadcast programming interface 302. As described in greater detail below, the data may be any data related to the broadcast programming, such as event information typically associated with an electronic program guide (EPG) 312. The data may also include recording settings 314, such as those set by a user to direct the broadcast programming receiver 304 to record one or more programs. In another implementation, the data may be one or more recorded programs 316 of the broadcast programming itself. Further, the data may include security information 318 identifying channels or programs to be blocked or disabled in the absence of a password or key, as well as status information 320 regarding the operation of one or more broadcast receivers, or any other portion of the broadcast communication system in which the receiver 300 is located. As a result, each of these types of data may be useful in the operation of other devices coupled to the receiver 300 or other unit initially possessing the data. Each of these data 312-320, as well as the effect of their transfer into or out of the receiver 300, is discussed in greater detail below.

Together with the control logic 310, the memory 304 may also provide a communication path to each of the broadcast programming interface 302, the communication network interface 306, and the output circuitry 308, as presented in FIG. 3. In other embodiments, such communication paths between these components may be provided separately from the memory 304 and the control logic 310.

Depending on the particular implementation, the broadcast programming receiver 300 may also include other circuits or components not shown in FIG. 3, such as multiple broadcast programming tuners. Many such circuits may be controlled by way of the control logic 310.

Depending on the particular operating environment, the broadcast programming receiver 300 may transmit any of data 312-320 stored within the memory 304 to a separate device, such as another receiver unit, over the communication network 340. In another case, the receiver 300 receives the data 312-320 from another device and stores the data in the memory 304. In yet another example, the receiver 300 may both send and receive the data 312-320 over the communication network 340.

Figure 4:
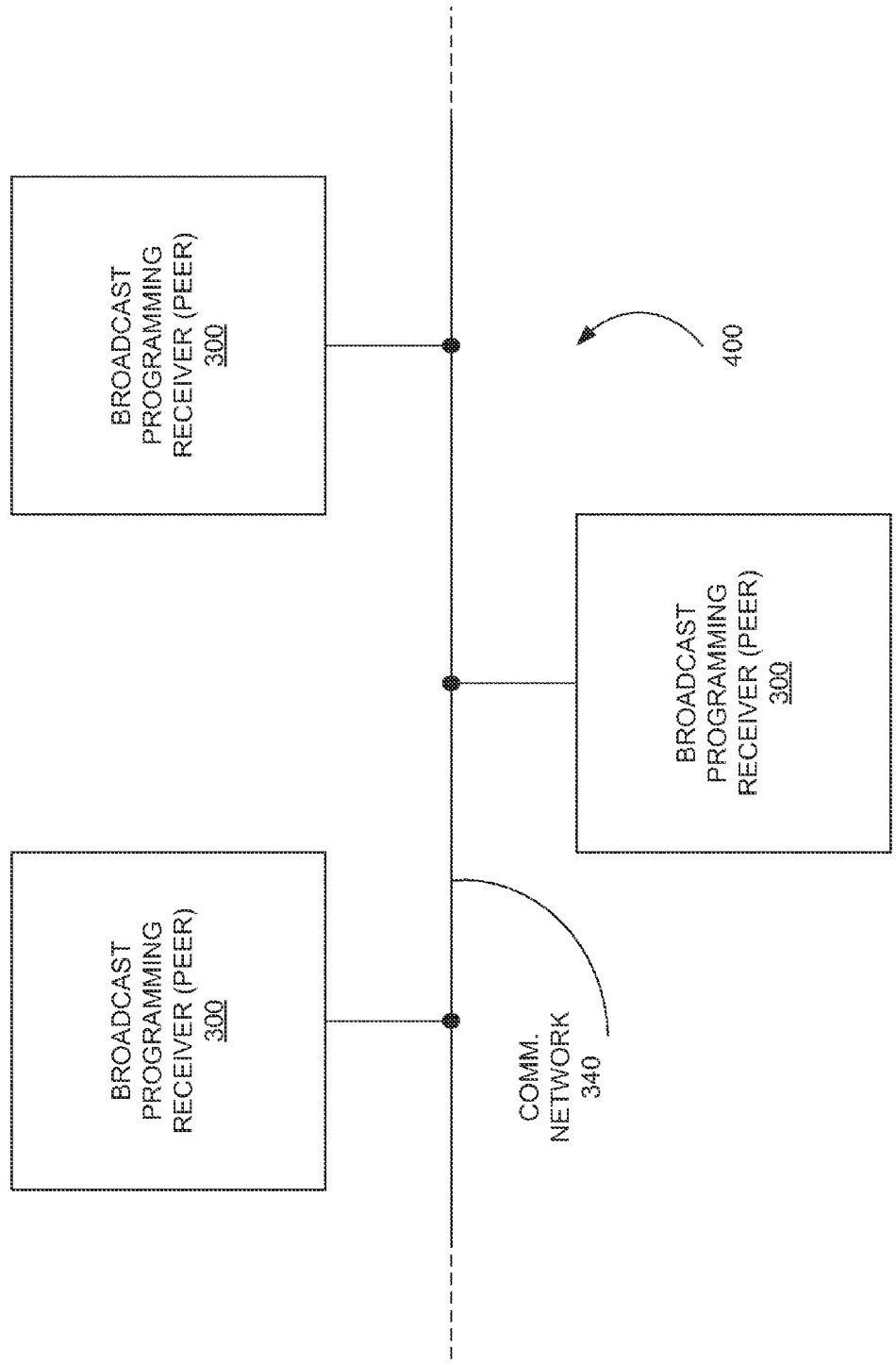
FIG. 4 is a block diagram of a peer networked system of receivers according to an embodiment of the invention.

The communication network 340, the receiver 300, and other devices coupled thereto may constitute a number of different networked systems tailored to meet the needs of a particular application. FIGS. 4-6 provide examples of such networked systems. In those examples, a single-bus type of architecture, such as what may be encountered in a Home-Plug® network environment, is employed, but different network topologies, such as ring or star configurations, may be employed in other embodiments.

FIG. 4 provides an example of a "federated" or distributed network system 400 in which a number of receivers 300 act as peers to share the data 312-320 each possesses. In one implementation, each receiver 300 may request at least a portion of the data 312-320 that resides in one or more of the remaining receivers 300 of the system 400. The requesting receiver 300 may request the data specifically from each of the other receivers 300, or may generate a broadcast request, to which any of the other receivers 300 may respond. In some situations, the latest or most recent data 312-320 may be required. To that end, the data 312-320 may be marked with a date and time label or other indicator that may be compared with those of other versions of the data 312-320 stored in the various receivers 300 to determine which data set is the most current. A goal of such a system 400 may be to ensure that the same version of data 312-320, such as the EPG data 312, is available at each of the receivers 300.

In FIG. 5, a client-server network system 500 includes a single "server" receiver 300a coupled with one or more "client" receivers 300b by way of the communication network 340. In such an arrangement, the server receiver 300a initially possesses most of the data 312-320, which may then be disseminated to the server receivers 300a. In one embodiment, the server receiver 300a may transmit the information to the client receivers 300b whenever the server receiver 300a acquires updated data 312-320. Alternately, the client receivers 300b may specifically request one or more portions of the data 312-320 from the server receiver 300a.

The configuration of system 500 may be selected over the peer architecture 400 of FIG. 4 for a number of reasons. For example, the server receiver 300a may possess more capability in terms of processing or storage capacity than the client receivers 300b, thus allowing the server receiver 300a to collect and store more data 312-320. In another example, the server receiver 300a may be coupled to the source of the broadcast programming by way of a separate communication connection 502, such as a phone line or Internet connection, not accessible by the client receivers 300b. Thus, the server receiver 300a may have initial access to at least some forms of the data 312-320 required by the client receivers 300b.

FIG. 6 shows an example of another system 600 in which a broadcast programming receiver 300 is coupled by way of the communication network 340 to a non-receiver device 602. Examples of such a device 602 include, but are not limited to, a personal computer (PC) and a personal digital assistant (PDA). In one embodiment, a user may generate some portion of the data 312-320, such as the recording settings 314 for the receiver 300, and then transfer the settings 314 over the communication network 340 to the receiver 300. In this case, the device 602 may provide a more user-friendly interface to generate the settings 314 than the receiver 300, thus allowing the user to employ the device 602 for that purpose before transferring the settings 314 to the receiver 300. Other forms of data 312-320 may be generated in a similar manner. In other implementations, some types of the data 312-320, such as the event information 312, may be transferred from the receiver 300 to the non-receiver device 602 over the network 340. Further, more than one receiver 300 may be coupled with more than one non-receiver device 602 via the network 340.

As can be seen in the networked systems 400, 500, 600 of FIGS. 4-6, the data 312-320 is transferred between one receiver 300 or non-receiver device 602 and another. However, the data 312-320 may be received by the sending receiver 300 or device 602 from another source prior to the data being transferred within the system 400, 500, 600. In one example, the receiver 300 sending the data 312-320 may have initially received that data from another receiver 300 or non-receiver device 602 over the communication network 340. In another application, the receiver 300 sending the data 312-320 may have received the data from the source of the broadcast programming, either by way of the broadcast programming interface 302 or another connection, such as the communication connection 502 depicted in FIG. 5. According to another embodiment, the receiver 300 sending the data 312-320 may have generated the data internally, either in some automated fashion, or at the initiation of a user by way of the user interface 322 of the receiver 300.

As discussed above, the data 312-320 may be any data related to the broadcast programming received by the broadcast programming receiver 300. The variety of the types of data 312-320 possibly being transferred in a particular system facilitates a wide range of functions. For example, if the data is event information 312 associated with an EPG, all or a portion of the event information 312 may be transferred from one receiver 300 or non-receiver device 602 to another. In one example, one or more receivers 300 may not have received the latest event information 312 due to that receiver 300 being disabled at the time the latest event information 312 was last transmitted with the broadcast programming. By receiving the event information 312 from another receiver 300, the receiver 300 accepting the data will not have to wait until the next download of the event information 312 from the programming source.

Presuming the use of the system 500 in which at least one of the client receivers 300b possesses less storage capacity for the event information 312 than the server receiver 300a, the client receiver 300b may request a portion of the event information 312 covering a shorter span of time than that covered by the entire event information 312 stored in the server receiver 300a. Similarly, the client receiver 300b may desire a particular portion of the event information 312 not currently stored in the memory 304 of the client receiver 300b. In response, the client receiver 300b may request the identified portion of the event information 312 from the server receiver 300a for display to the user.

If, instead, the data to be transferred are recording settings 314, the data may be transferred about a networked system 400, 500, 600 in many ways depending on the particular goal to be accomplished. For example, a user may desire that none of the receivers 300 networked together record the same program twice in order to more efficiently utilize the collective storage capacity of the system. To accomplish this goal, the receivers 300 may be configured to swap recording settings 314 periodically to detect and eliminate duplicate recording settings. In another situation, the user may desire to record more programs at one particular time than the number of tuners available in one receiver 300. Instead of requiring the user to program another receiver 300 to record one of the programs, the user may program the original receiver 300, and in response, the original receiver 300 may transfer the recording settings for the additional program to another receiver 300 over the communication network 340 to distribute the recordings across multiple receivers 300. Many other implementations involving the transfer of recording settings across multiple receivers 300 are also possible. In another embodiment, a non-receiver device 602 (shown in FIG. 6) may be used as a platform for a user to program the recording settings and download the settings to one or more receivers 300 capable of recording the desired programs.

Depending on the bandwidth and usage of the communication network 340, the data to be transferred may include programs 316 that have been recorded on one receiver 300 for viewing via another connected receiver 300. Such a program 316 may be completely transferred from one receiver 300 to another before viewing begins, or only a certain portion of the program 316 may be required to be transferred and buffered to the destination receiver 300 before display to the user. Such a networked system thus provides mobility of a program recorded on any of the networked receivers 300 to any other of the receivers 300.

As mentioned above, the data may be security or "blocking" information 318, such as information related to preventing access to specific channels or programs by children or other users not privy to an access code or key. At times, such information may be rather arduous to input into multiple receivers 300 of a home. To facilitate protecting all connected receivers 300 in such a fashion, this security information 318 may be programmed into a single receiver 300. The programmed receiver 300 may then transfer that data to all other connected receivers 300 over the communication network 340 to set the identical security status for each receiver 300, thus eliminating the time and effort normally required for the user to manually program the security features of each receiver 300.

In another embodiment, the data may include status information 320 regarding the operational status or "health" of one or more components of the broadcast system, such as specific programming channels, broadcast satellites, individual transponders within a particular satellite, or the like. Such information may be generated within each of the networked receivers 300, transferred among the receivers 300, and collectively compared to determine the actual operational status 320 as detected by each receiver 300 to help determine the cause of the problem. For example, if all receivers 300 of a particular networked system determine that a specific transponder of one satellite is inoperative, the determination is likely correct. Oppositely, if only one of the receivers 300 detects an inoperative transponder, the problem most likely lies within the receiver 300 sensing the problem. The results of the comparison could then be relayed to the user, the broadcast communication system, or both. In one implementation, each of the networked receivers 300 may transfer their status information 320 to a predetermined receiver 300, such as the server receiver 300a in the client-server networked system 500 of FIG. 5, which may then compare each copy of the status information 320 received from the client receivers 300b to determine the underlying cause of the detected problem.

Based on the limited examples illustrated above, transferring data associated with broadcast programming among a group of broadcast programming receivers networked may provide any of several advantages. Generally, such networked receivers may be configured to operate as a single, large receiver unit by virtue of the passing of the data between the receivers. This distribution of data allows, for example, a user to program recording settings in one receiver, and to allow those settings to propagate to other receivers of the system. Also, if recorded programs may be transferred from one receiver to another, the collective DVR storage of the receivers may be operated as a signal extensive DVR with a capacity essentially equal to the sum of the program storage capacities of all of the receivers. Use of a networked system may also facilitate the employment of a single, high-performance "server" receiver networked with other, less-capable "client" receivers to form a highly-capable networked system at a reduced cost. Further, presuming some of the data may be introduced into the system by way of an alternative interface, such as a phone or Internet connection, only a single such connection to a receiver may be necessary as long as that data may be relayed to other receivers over the communication network coupling the receivers together. Further, use of a standardized communication network may allow the data to be supplied by a non-receiver device, such as a PC, thus allowing a user to define recording settings and other data using the capabilities of the device before transmitting the data to one or more receivers.

While several embodiments of the invention have been discussed herein, other embodiments encompassed by the scope of the invention are possible. For example, while various embodiments have been described herein primarily within the context of satellite television broadcast programming, receivers devised primarily for reception of satellite radio signals, cable television and radio signals, terrestrial television and radio signals, and other forms of broadcast programming may be utilized in other embodiments. Also, while particular forms of data associated with broadcast programming, such as event information and recording settings, have been discussed, other forms of such data not specifically discussed herein may be involved in other implementations. In addition, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A broadcast programming system, comprising:
    a first broadcast programming receiver, comprising:
        a first communication network interface for communicating with a second broadcast programming receiver via a communication network;
        a first broadcast programming interface for receiving broadcast programming via a broadcast system from a content provider and obtaining data related to broadcast programming, comprising: electronic programming guide event information, security information associated with access to the broadcast programming, and status information associated with operational status of at least one component of the broadcast system; and
        a first memory for storing the data related to the broadcast programming; and
    a second broadcast programming receiver, comprising:
        a second communication network interface for communicating with the first broadcast programming receiver via the communication network;
        a second broadcast programming interface for receiving broadcast programming via the broadcast system from the content provider;
        control logic that generates a request for data from the first broadcast programming receiver, wherein the request is generated after the first broadcast programming receiver receives the broadcast programming and the request is transmitted to the first broadcast programming receiver via the second communication network interface and the communication network, wherein
            in response to the request, receiving, via the second communication network interface, from the first broadcast programming receiver at least one type of data selected from the group consisting of: the event information, recording settings of the first broadcast programming receiver,
    security information for the broadcast programming, the status information, and the broadcast programming.

2. The broadcast programming system of claim 1, wherein the control logic of the second programming receiver is configured to use the received recording settings to eliminate one or more duplicate recording settings set for recording at the second programming receiver.

3. The broadcast programming system of claim 1, wherein the first broadcast programming receiver and the second broadcast programming receiver receive broadcast programming via a satellite broadcast system from the content provider.

4. The broadcast programming system of claim 1, wherein the second broadcast programming receiver further comprises:
    a second memory for storing a second set of data related to broadcast programming, wherein the second data is received from the content provider via the second broadcast programming interface for receiving broadcast programming, wherein:
        the second communication network interface is configured for receiving a second request for the second data from the first broadcast programming receiver;
        the control logic is configured to process the second request; and
        in response to the request, the control logic, via the second communication network interface, is configured to transfer at least a portion of the second data to the first broadcast programming receiver over the communication network.

5. The broadcast programming system of claim 4, wherein: the first broadcast programming receiver is a server device, the first memory being of larger capacity than the second memory of the second broadcast programming receiver.

6. The broadcast programming system of claim 5, the first broadcast programming receiver further comprising an Internet connection component, the Internet connection component being distinct from the first communication network interface, wherein the Internet connection component permits communication between the first broadcast programming receiver and the content provider.

7. The broadcast programming system of claim 1, the first broadcast programming receiver further comprising first output circuitry configured to output video to a first television; and the second broadcast programming receiver further comprising second output circuitry configured to output video to a second television.

8. The broadcast programming system of claim 1, wherein obtaining the data by the first broadcast programming interface comprises recording broadcast programming to the memory of the first broadcast programming receiver.

9. The broadcast programming system of claim 1, wherein the first broadcast programming receiver is further configured to transfer security information indicative of channel restrictions to all broadcast programming receivers connected with the communication network.

10. A broadcast programming receiver, comprising:
    a communication network interface for communicating with a second broadcast programming receiver via a communication network;
    a broadcast programming interface for receiving broadcast programming via a broadcast system from a content provider;
    control logic for:
        generating a request for data related to broadcast programming after receiving the broadcast programming;
        sending the request for the data to a networked device via the communication network using the communication network interface;
        receiving the data from the networked device via the communication network using the communication network interface;
        determining from recording settings within the received data whether particular broadcast programming has been previously recorded; and
        eliminating a scheduled recording of the particular broadcast programming by the broadcast programming receiver based on the recording settings.

11. The broadcast programming receiver of claim 10, wherein the request is sent to a networked device selected from the group consisting of: a second broadcast programming receiver, a server receiver, and a non-receiver device.

12. The broadcast programming receiver of claim 10, wherein the broadcast programming receiver receives broadcast programming via a satellite broadcast system from the content provider.

13. The broadcast programming receiver of claim 12, wherein the control logic is further configured to:
receive a first set of operational status information about a particular transponder of a satellite of the satellite broadcast system from a second broadcast programming receiver in communication with the communication network;
determine a second set of operation status information about the particular transponder of the satellite;
compare the first and second sets of operational status information about the particular transponder; and
determine, based on the comparison, a fault with the particular transponder.

14. The broadcast programming receiver of claim 13, wherein the control logic is further configured to output a result of the determined fault for presentation to a user.

15. The broadcast programming receiver of claim 10, wherein the broadcast programming receiver is a server device, the memory of the broadcast programming receiver and processing capability of the control logic being greater than each other broadcast programming receiver in communication with the broadcast programming receiver via the communication network.

16. The broadcast programming receiver of claim 15, the broadcast programming receiver further comprising an Internet connection component, the Internet connection component being distinct from the communication network interface, wherein the Internet connection component permits communication between the broadcast programming receiver and the content provider via the Internet.

17. The broadcast programming receiver of claim 15, further comprising:
a user interface through which a user provides an indication of one or more channels to which access is to be restricted, wherein the broadcast programming receiver is further configured to transfer security information indicative of restricted television channels to one or more additional broadcast programming receivers connected with the communication network.

18. The broadcast programming receiver of claim 10, the broadcast programming receiver further comprising output circuitry configured to output video to a display device.

19. A broadcast programming system, comprising:
a first broadcast programming receiver, comprising:
a first communication network interface for communicating with a second broadcast programming receiver via a communication network;
a first broadcast programming interface for receiving broadcast programming via a broadcast system from a content provider and obtaining data related to broadcast programming comprising broadcast programming; and
a first memory for storing recording settings and recording the broadcast programming; and
a second broadcast programming receiver, comprising:
a second communication network interface for communicating with the first broadcast programming receiver via the communication network;
a second broadcast programming interface for receiving broadcast programming via the broadcast system from the content provider;
control logic that generates a request for the data from the first broadcast programming receiver, wherein the request is transmitted to the first broadcast programming receiver via the second communication network interface and the communication network, wherein
in response to the request, receiving, via the second communication network interface, from the first broadcast programming receiver, the recording settings.

20. The broadcast programming system of claim 19, wherein the control logic of the second broadcast programming receiver is further configured to:
determine from the recording settings that particular broadcast programming has been previously recorded or is schedule for recording by the first broadcast programming receiver; and
eliminate a scheduled recording of the particular broadcast programming based on the received recording settings.

* * * * *